US008892534B2

(12) United States Patent
Hamlescher et al.

(10) Patent No.: US 8,892,534 B2
(45) Date of Patent: Nov. 18, 2014

(54) SYSTEM AND METHOD FOR INTEGRATING DATA QUALITY METRICS INTO ENTERPRISE DATA MANAGEMENT PROCESSES

(75) Inventors: Sabine Hamlescher, Bruehl (DE); Hartmut K. Vogler, Millbrae, CA (US); Suresh Babu, Los Altos, CA (US)

(73) Assignee: SAP SE, Walldorf (DE)

( * ) Notice: Subject to any disclaimer, the term of this patent is extended or adjusted under 35 U.S.C. 154(b) by 734 days.

(21) Appl. No.: 12/168,065

(22) Filed: Jul. 3, 2008

(65) Prior Publication Data

US 2010/0005346 A1 Jan. 7, 2010

(51) Int. Cl.
*G06F 17/30* (2006.01)
*G06Q 10/06* (2012.01)
*G06Q 10/10* (2012.01)

(52) U.S. Cl.
CPC .............. *G06Q 10/10* (2013.01); *G06Q 10/06* (2013.01)
USPC ............ 707/702; 707/703; 707/822; 707/802

(58) Field of Classification Search
CPC .................................. G06F 17/30; G06F 17/00
See application file for complete search history.

(56) References Cited

U.S. PATENT DOCUMENTS

| 6,041,306 | A  | * | 3/2000 | Du et al. ................. 705/7.26 |
| 6,636,585 | B2 | * | 10/2003 | Salzberg et al. ............ 379/22 |
| 2003/0033179 | A1 | * | 2/2003 | Katz et al. ................. 705/7 |
| 2009/0327006 | A1 | * | 12/2009 | Hansan et al. ............. 705/7 |

OTHER PUBLICATIONS

Muehlen, Michael, "Organizational Management in Workflow Applications—Issues and Perspectives," Information Technology and Management, 2004, pp. 271-291.*
Prat, Nicolas and Madnich, Stuart, "Measuring Data Believability: A Provenance Approach," IEEE, Proceedings of the 41st Hawaii International Conference on System Science, Jan. 7-10, 2008, pp. 1-10.*
Peralta, Veronika, "Data Freshness and Data Accuracy: A State of the Art,:" Mar. 2006, Instituto de Computacion, Facultad de Ingeneria, Universidad de la Republica, Uruguay, pp. 1-36.*
Moody, Daniel L., "Metrics for Evaluating the Quality of Entity Relationship Models," 1998, Springer-Verlag Berlin Heidelberg, ER '98, LNCS 1507, pp. 211-225.*

* cited by examiner

*Primary Examiner* — Farhan Syed
(74) *Attorney, Agent, or Firm* — Kenyon & Kenyon LLP

(57) ABSTRACT

A method and system for assessing data quality stored in an enterprise database is provided. In response to a request by a user, a pre-determined event, or other event, a profile is chosen from a list of profiles stored in a profile database based on the request, wherein the profile includes a set of rules for calculating data quality metrics and for triggering workflow processes. One or more data records are received from one or more enterprise databases. The data quality metrics of the one or more data records based on the set of rules for calculating data quality metrics is calculated. Based on the calculated data quality metrics and rules for triggering workflow, a determination is made regarding whether to trigger one or more workflow processes: and, if so, triggering the one or more workflow processes; and/or converting the calculated data quality metrics to a representation for display.

28 Claims, 23 Drawing Sheets

| Attribute | Rule 1: Validity | | | Rule 2: Completeness | | ... |
|---|---|---|---|---|---|---|
| Account Group Code | Length is max. 4 | Consists of Characters | Account Group code is valid | This attribute is essential to the record | High importance | ... |
| Account Group Name | Length is max. 15 | | Account Group name is valid | This attribute is moderately important for the record | Moderate importance | ... |
| Address Time Zone | Format is either (GMT+hh:mm) or (GMT-hh:mm) | | Address Time Zone is valid | This attribute is not required | No relevance | ... |
| City | Length is max. 35 | City can be found in Lookup Table | City is valid | This attribute is very important for the record | High importance | ... |
| ... | ... | ... | ... | ... | ... | ... |

Fig. 5

Process Configuration: Metrics selection

| | Check for activating | What has to be activated as well: |
|---|---|---|
| Accuracy | ☐ | - |
| Duplicates | ☐ | - |
| General complete | ☐ | - |
| Minimal complete | ☐ | - |
| Value adding attribute | ☐ | - |
| Value adding record | ☐ | - |
| Physical Accessibility | ☐ | - |
| Cognitive Accessibility | ☐ | - |
| Timeliness | ☐ | Currency |
| Currency | ☐ | - |
| Trustable record | ☐ | Currency, Timeliness, Trustable Source System |
| Trustable source system | ☐ | - |
| Compliance | ☐ | - |
| Consistency | ☐ | - |

Fig. 6

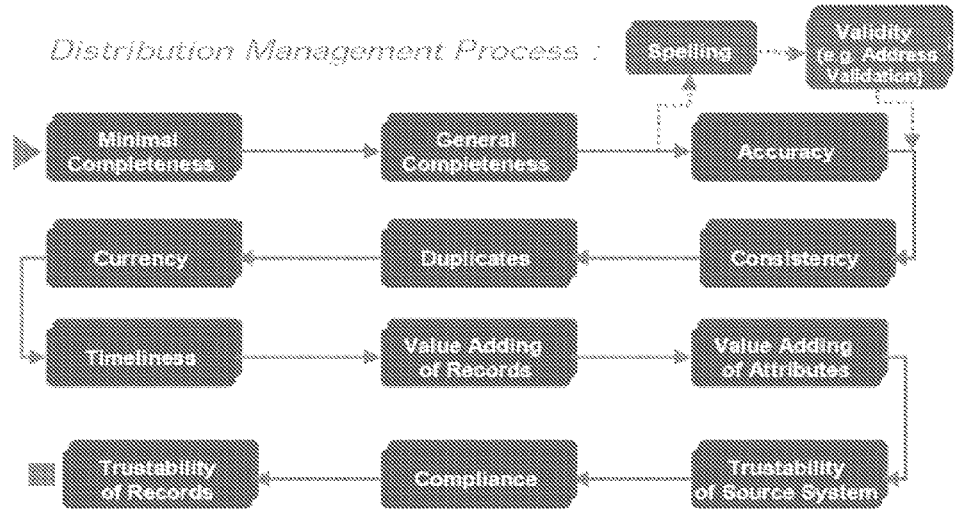

Fig. 8F

| Context 1 | Context 2 | Result 1 | Result 2 |
|---|---|---|---|
| General Completeness shows that address is incomplete | | Do not validate address | |
| Spelling check shows a bad result | | Do not perform any validity checks | |
| General Completeness is very low | Accuracy is very low | Do not check for duplicates | |
| Currency shows actual frequency of change is below average frequency of change | | Do not measure timeliness | |
| Physical Accessibility is low | Cognitive Accessibility is low | Do not measure value adding of records | Do not measure value adding of attributes |

Fig. 9

| Scenario (Basic Context) | Context 1 | Context 2 | Result 1 | Result 2 | Result 3 |
|---|---|---|---|---|---|
| Vendor Search and Select | | | Do not evaluate cognitive accessibility | | |
| Multi Stage Create / Add Supplier | | | Do not check value adding and currency | Do not check trustability of source system | Do not evaluate cognitive accessibility |
| Multi Stage Update Supplier | | | Do not check value adding of the changed attributes | Do not check trustability of source system | Do not evaluate cognitive accessibility |
| Multi Stage Deactivate / Archive Supplier | | | ( perform all quality checks for the suppliers to archive ) | | |
| Import Management Process | | | Do not evaluate cognitive accessibility | | |

Fig. 10A

| Scenario (Basic Context) | Context 1 | Context 2 | Result 1 | Result 2 | Result 3 |
|---|---|---|---|---|---|
| Distribution Management Process | Distribute records to other systems | | Do not check accessibility | | |
| Data Cleansing & Enrichment Process | Service provider is called directly | | ( no further data quality checks ) | | |
| Refresh Process | | | Complete check before the refresh | Check duplicates after the refresh | |
| Regular Quality Assessment | High timeliness of record | Last address validation has been performed within a certain period | Do not validate address | | |
| | No major basic changes since last assessment | | Do not evaluate cognitive accessibility | | |

Fig. 10B

| Context 1 | Context 2 | Result 1 | Result 2 |
|---|---|---|---|
| *Take aspects of ranking into consideration* | | | |
| Tested set of records is huge | | Do not prompt user to confirm spelling errors | Do not request user interaction for finding duplicates |
| Call external service for validation | Check multiple records | Call service once for a bundle of records and not multiple times for one after the other | |
| Huge set of records | | Make tradeoff: Do you want to cover all metrics, but only for part of the records, or only some metrics but all records? Define the other rules according to that decision | |

Fig. 11A

| Context 1 | Context 2 | Result 1 | Result 2 |
|---|---|---|---|
| Minimal incomplete. | | Direct contact is not possible. | Customer might be lost due to missing contact. |
| Address is invalid. | | Direct contact is not possible. | Customer might be lost due to missing contact. |
| Banking information is invalid / untimely. | | Payment fails and discount forfeits. | Late fees might be added. |
| Supplier has been updated / added with a future effective date. | Banking information is not yet valid. | Discounts might be taken that are not yet effective. | An additional charge might be added. |

Fig. 11B

| Scenario (Basic Context) | Scenario 1 | Result 1 | Result 2 |
|---|---|---|---|
| Vendor Search and Select | | Inform user about erroneous data. | |
| Multi Stage Update Supplier | One single record. | Only prompt user to correct erroneous data. | |
| | One single record. | Only prompt user to correct erroneous data. | |
| Deactivate / Archive Supplier | One single record. | Show detailed report containing all quality results for this record. | |
| | Set of records. | Show detailed report containing all quality results. Select whether to see all the single record results or only the aggregate ones. | |
| Import Management Process | One single record. | Only prompt user to correct erroneous data for that record. | |
| | Set of records. | Bundle and group the correction requests and present them to the user after the whole import has been finished. | Offer a detailed report containing all the quality results for that import. |

Fig. 12A

| Scenario (Basic Context) | Scenario 1 | Result 1 | Result 2 |
|---|---|---|---|
| Distribution Management Process | One single record. | Only prompt user to correct erroneous data. | |
| | Set of records. | Bundle and group the correction requests. | Offer a detailed report containing all the quality results for that distribution. |
| Cleansing & Enrichment Process | One single record. | Show result of Trillium (and maybe also D&B) process. | |
| | Set of records. | Show bundled and grouped results of Trillium (and maybe also D&B) processes. | |
| Refresh Process | One single record. | Show duplicates. | |
| | Set of records. | Show duplicates. | |
| Regular Quality Assessment | Automated assessment | Only notification with critical results | |
| | Manual assessment | Offer quick (only critical data) or detailed (full report) results to be displayed, either record wise or bundled | |

Fig. 12B

| Scenario (Basic Context) | Context 1 | Result 1 | Result 2 |
|---|---|---|---|
| Search & Select | Specified Metric below critical value | Warn user or request an update | |
| Multi Stage Create / Add Supplier | Incomplete record | Warn user for attributes with medium priority | Request value with high priority, but unless it is a mandatory attribute allow to proceed without entering it |
| | Accuracy, consistency, duplication or accessibility problem occurs. | Inform user and request correction | Data Cleansing & Enrichment process. |
| Multi Stage Update Supplier | | Inform user and request correction | Data Cleansing & Enrichment process. |
| | Name changes while there are outstanding shopping carts, purchase orders, invoices and payments. | Update bank information. | Reflect changes in related transactions. |
| | Change in the ownership hierarchy after acquisition with future effective date. | Update bank information. | Cancellation of related transactions and reissuing them. |
| Multi Stage Deactivate / Archive Supplier | | (nothing suggested) | |

Fig. 13A

| Scenario (Basic Context) | Context 1 | Context 2 | Result 1 | Result 2 |
|---|---|---|---|---|
| Import Management Process | | Inform user and request correction | Data Cleansing & Enrichment process. | |
| Distribution Management Process | | | Inform user and request correction | Data Cleansing & Enrichment process. |
| Data Cleansing & Enrichment Process | | | | |
| Refresh Process | | | Inform user and request correction | |
| Regular Quality Assessment | | | Inform user and request correction | Data Cleansing & Enrichment process. |

Fig. 13B

Security

| Aspect | Context 1 | Context 2 | Context 3 | Result 1 |
|---|---|---|---|---|
| Passwords | Are not initial | Do not contain user name or full name ( neither the complete string or any substrings ) | Use at least three of the four available character types: lowercase letters, uppercase letters, numbers and symbols | Password is safe |
| Roles | Technical and business side admins are different | At least one role has restricted access rights | | Role concept is safe |
| Users | Role assignment is linked with employee functions in the company | Role assignment is valid and timely | User name is the company user ID | User is assigned properly to the adequate role |
| Workflows | All important attribute changes require an approval | Approval responsibilities are defined | Approval process is defined | Workflows enable high security level |
| Model | APIs accessing the records are protected | | | Data cannot be accessed via interfaces |

Fig. 14

| Id | Vendor Number | Account Group | Name 1 |
|---|---|---|---|
| 001 | 2345 | A001 | Owens Electric & Solar |
| 002 | 2345 | A001 | J & J Owens Electric, Inc. |

Fig. 15A

| | | | O | W | E | N | S | | E | L | E | C | T | R | I | C | | & | S | O | L | A | R |
|---|---|---|---|---|---|---|---|---|---|---|---|---|---|---|---|---|---|---|---|---|---|---|---|
| X | X | X | ✓ | ✓ | ✓ | ✓ | ✓ | ✓ | ✓ | ✓ | ✓ | ✓ | ✓ | ✓ | ✓ | ✓ | ✓ | X | X | X | X | X | X |
| J | & | J | | O | W | E | N | S | | E | L | E | C | T | R | I | C | , | | I | N | C | . |
| 1 | 1 | 1 | | | | | | | | | | | | | | | | 1 | 1 | 1 | 1 | 1 | 1 |

Fig. 15B

Vendor (Main table)

| ID | Vendor Number | Account Group | Name 1 | ... | E-Mail Address |
|---|---|---|---|---|---|
| 001 | 2345 | A001 | OWENS ELECTRIC&SOLAR | | Standard Address / San Mateo Station |

E-Mail Addresses (Lookup table)

| Address Type | Std. | E-Mail Address | Sequence No. |
|---|---|---|---|
| Standard Address | X | info@owenselectricinc.com | C 264 |

Fig. 18

Vendor (Main table)

| ID | Vendor Number | Account Group | Name 1 | ... | Phone Numbers | Fax Numbers | E-Mail Address |
|---|---|---|---|---|---|---|---|
| 001 | 2345 | A001 | OWENS ELECTRIC&SOLAR | ... | United States | United States | Standard Address |

Phone Numbers (Lookup table)

| Country | Standard No. | Telephone | Extension | Complete No. | Sequence No. |
|---|---|---|---|---|---|
| United States | Yes | +1 650 373 | 2953 | +1 650 373 2953 | A 264 |

Fax Numbers (Lookup table)

| Country | Standard No. | Telephone | Extension | Complete No. | Sequence No. |
|---|---|---|---|---|---|
| United States | No | +1 650 342 | 2228 | +1 650 342 2228 | B 264 |

E-Mail Addresses (Lookup table)

| Address Type | Std. | E-Mail Address | Sequence No. |
|---|---|---|---|
| Standard Address | X | info@owenselectricinc.com | C 264 |

Fig. 19

| | |
|---:|:---|
| Name | characters, numbers, special characters |
| Street | characters, numbers, defined special characters ( & . - ) |
| House Number | characters, numbers |
| City | Characters, defined special characters ( - . ) |
| City Postal Code | numbers (US/Germany: 5 digits, ... ) |
| E-Mail Address | characters (must contain "@" and "."), defined special characters ( - _ ) |
| Phone/Fax Number | numbers |
| Country | Characters, defined special characters ( - ) |

Fig. 20

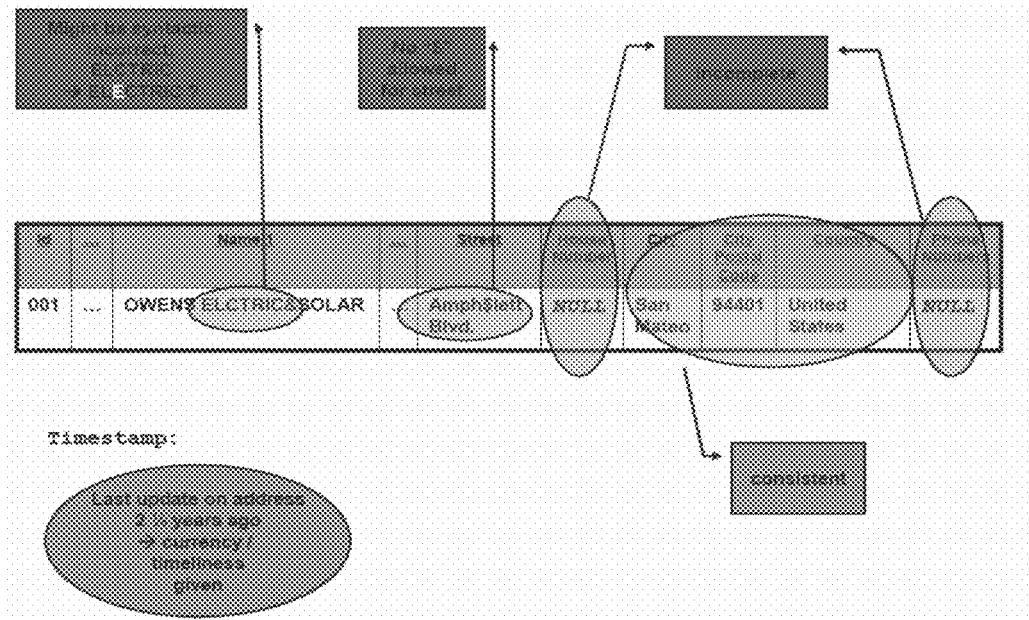

Fig. 21

SYSTEM AND METHOD FOR INTEGRATING DATA QUALITY METRICS INTO ENTERPRISE DATA MANAGEMENT PROCESSES

BACKGROUND

Companies may need to measure and ensure the data quality stored in their enterprise database systems. Data quality may be reflected in different aspects. A reasonable measurement of data quality may need to take into account of all these aspects. The measurement of data quality may further depend on several surrounding factors, e.g., security of the database system, which may drastically change the results if ignored.

Existing discrete technologies and algorithms for measuring data quality have not been systematically integrated to take into account of all aspects of data quality. Current data quality assessment services concern themselves only with part of the whole range of data quality aspects. That is, they do not provide a user with a comprehensive assessment of the enterprise data quality. Moreover, they do not offer the flexibility of customizing the assessment to the user's general data environment or to the different scenarios in which the user may want to run the assessment. Furthermore, the results of data quality measurements are not linked to a triggering mechanism that may automatically trigger workflow processes based on the assessment of data quality and pre-determined rules.

BRIEF DESCRIPTION OF THE DRAWINGS

FIG. 5 shows rules customized for a specific data model with a set of attributes according to an embodiment of the present invention.

FIG. 6 shows an example embodiment of the present invention in which a user may choose a selection of metrics for rules of metrics selection.

FIGS. 8A-F show example embodiments of ranking of metrics measurements under different scenarios.

FIG. 9 shows an example of the ranking of measurement dependent on the results of previously determined metrics.

FIGS. 10A-B show examples of scenario with basic contexts and scenario with additional contexts according to an embodiment of the present invention.

FIGS. 11A-B show examples of the ranking of rules influenced by direct and indirect cost factors according to an embodiment of the present invention.

FIGS. 12A-B show representation rules generated according to scenarios and/or sub-scenarios.

FIGS. 13A-B show examples of different workflow triggering rules under different scenarios and conditions according to an embodiment of the present invention.

FIG. 14 shows examples of security aspects and suggested high level best practices for security.

FIGS. 15A-B show an example of main table of a vendor and the calculation of a syntactic distance between two strings of company names.

FIG. 18 shows an example of high frequency use of e-mail address.

FIG. 19 shows an example of minimum and general completeness of a data record.

FIG. 20 shows an example table of data entries and their corresponding format specifications.

FIG. 21 shows an example result of applying the data quality metric modules to a data record in one or more enterprise databases.

DETAILED DESCRIPTION

Embodiments of the present invention provide a system, method, and computer-readable medium including instructions which integrate data quality metrics into enterprise data management processes based on configuration rules. Data quality is measured by using a set of metrics that take into account of all different aspects of data quality. An integrated business rule based engine may flexibly take into account of all possible surrounding factors, e.g., different scenarios and purposes of a data quality assessment. In addition, data quality assessment modules may be linked with a workflow engine or a business process management (BPM) engine, so that all kinds of workflows or processes may be triggered either during the assessment or based on the results of the data quality assessment, where the assessment may use, e.g., SAP MDM functionality linked to data storages.

Embodiments of the present invention provide a holistic approach on data quality. Different data metrics are calculated, and the results of which are usable by a rules engine to determine the next steps and/or actions, e.g., human interaction or different roles, or the call of data cleansing or enhancement services. In an embodiment, the rules also take into account the different scenarios (e.g., data create, update, and/or regular/periodic check of data records), data type and/or who triggered the action.

Embodiments of the present application allow a corporation to automatically assess the data quality stored in its enterprise databases using an enterprise database management system, e.g., a SAP Master Data Management (MDM) system. The data quality may include multiple aspects measured in terms of data quality metrics, e.g., completeness, accuracy, provenance, consistency, time reference, accessibility and value adding. Within an enterprise database management system, the data may be organized in a certain way, e.g., according to vendors or business partners. For each vendor, the system may need to check a list of vendor master data, e.g., for duplicate names, duplicate addresses, duplicate bank information, completeness of bank information, and address validation etc.

The assessment of data quality may be provided using rules that may be set up by using metrics. The rules may be aggregated into a profile for the convenience of a user. For example, a user may login in a certain role and choose a specific profile for a certain task. The user may create a new profile for a new task by configuration of rules specified to the profile. Based on profiles and rules specified in the profiles, the data quality assessment system may make calculations to determine the data quality stored in the enterprise database. Based on the determination, the system may display the results to the user in an appropriate representation or automatically trigger workflow processes according to a set of triggering rules and the calculated results.

Figure 1:
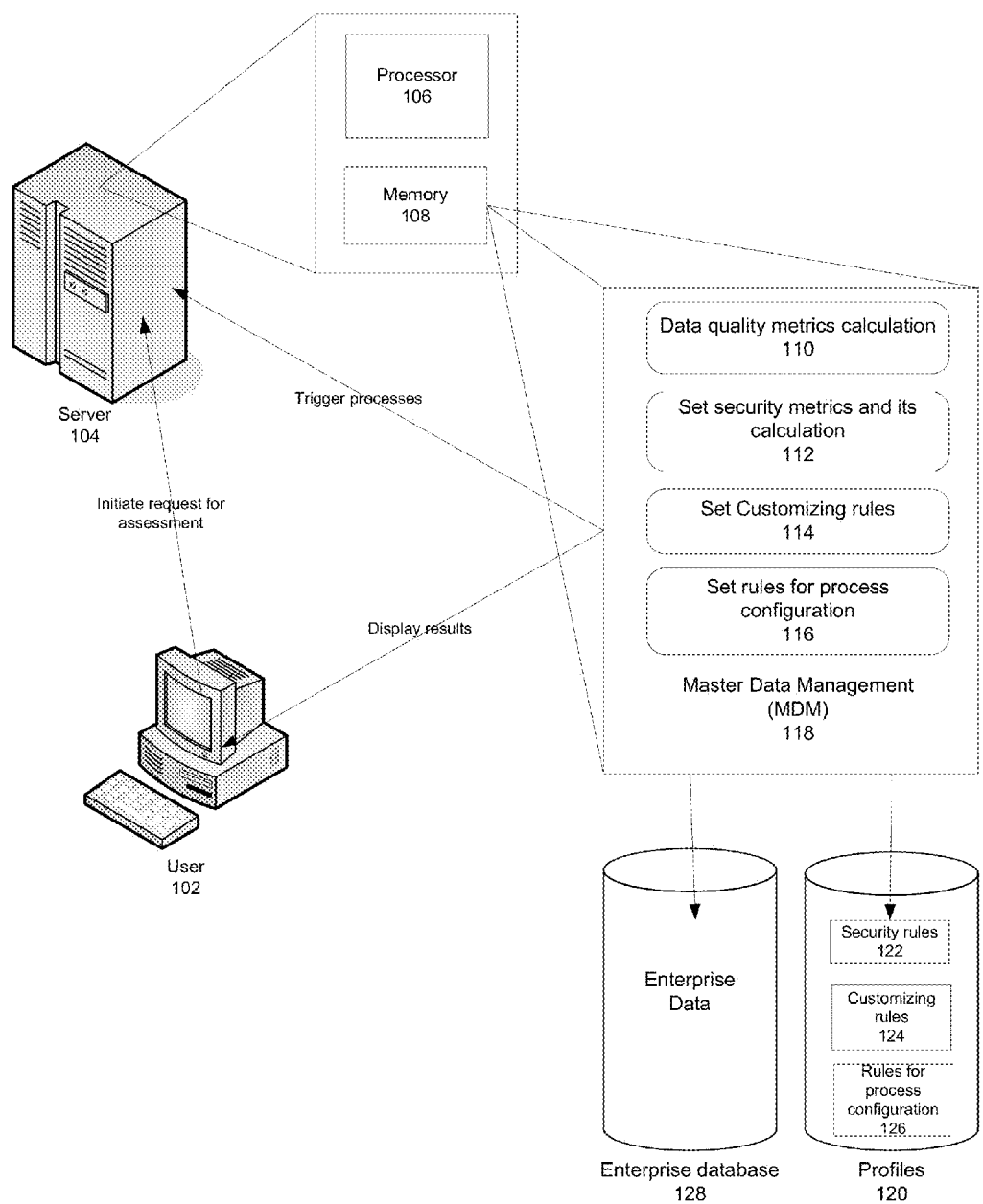
FIG. 1 shows an example system for integration of data quality metrics into enterprise data management processes based on configuration rules and roles according to an embodiment of the present invention.

FIG. 1 shows an example system for integrating data quality metrics into enterprise data management processes based on configuration rules and roles according to one example of the application. The system may include a server 104 including a processor 106, a memory 108, a first storage 120 for storing enterprise data and a second storage 128 for storing user-specified profiles, where the first storage 120 and the second storage 128 may reside physically in a single hard disk or in separate hard disks. The processor 106 may execute application instructions stored, for example, in the memory 108 based on a request initiated by an end user 102 or automatically generated according to preset rules or conditions stored in memory 106 or in storage 120. The execution of application may include processing data stored in the memory 106 or in the storages 120, 128. The data quality assessment application may be implemented using a data management platform, e.g., the SAP MDM, and may include an executable component for calculating data quality metrics using a set of rules set up for these metrics. For convenience, the user may specify each set of rules as a profile and store the profile in profile database 120. Based on the result of a calculation of these metrics, the system may automatically make a determination of the data quality of enterprise data, based on which the system may trigger workflow processes through the server 104 or display results to the user 102. Furthermore, the application may provide the user a user interface for specifying new profiles by combining different rules that are in existence or by creating new rules. The new profiles may be created in response to user's need, e.g., a data quality check under a new schedule, or in response to new type of data that require new rules set up for new metrics and therefore new profiles.

For exemplary purposes, an MDM system is discussed with respect to some of the embodiments of the present invention. This reference is not meant to limit the scope of the application to just one specific MDM system. And, instead, the embodiments herein apply to other enterprise database management systems.

Figure 2:
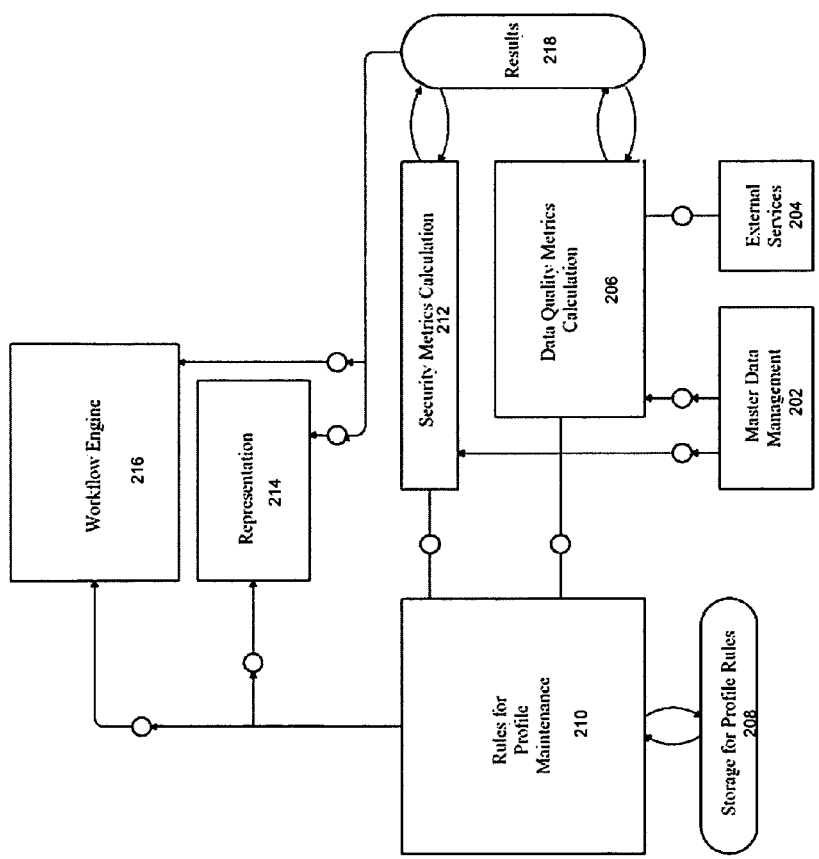
FIG. 2 shows an example of high level components included in the system for integration of data quality metrics into enterprise data management processes based on configuration rules and roles according to an embodiment of the present invention.

FIG. 2 shows an example of high level components included in the system for integrating data quality metrics into enterprise data management processes based on configuration rules and roles according to one example of the present invention. A computer software application may have one component 206 that executes codes for calculating data quality metrics and may read the data through a data management system, e.g., here a SAP MDM 202, to a database, e.g., a SAP MDM Database, or directly from databases connected to the application. Several external services 204 may also be called for the calculation. The computer software application may also have another component 212 for calculating security metrics for the data stored in databases. The calculation of data quality metrics and security metrics may depend on the rest of the results 218. For convenience, a user may save settings he has defined, e.g., for security rules 122, customizing rules 124 and rules for process configuration 126 and further, combine them into a profile for storage in the storage for profile rules 208. By this way, the user may reuse and modify the settings of rules in an efficient way without having to reconfigure everything every time he wants to perform an assessment of data quality.

The calculated results 218 may trigger the workflow engine 216 to start certain processes e.g., for a correction of data quality according to the profile or rules specified in the profile. In addition, based on the profile or rules specified in the profile, the system may convert the results into a representation 214 suitable for displaying to the user.

Figure 3:
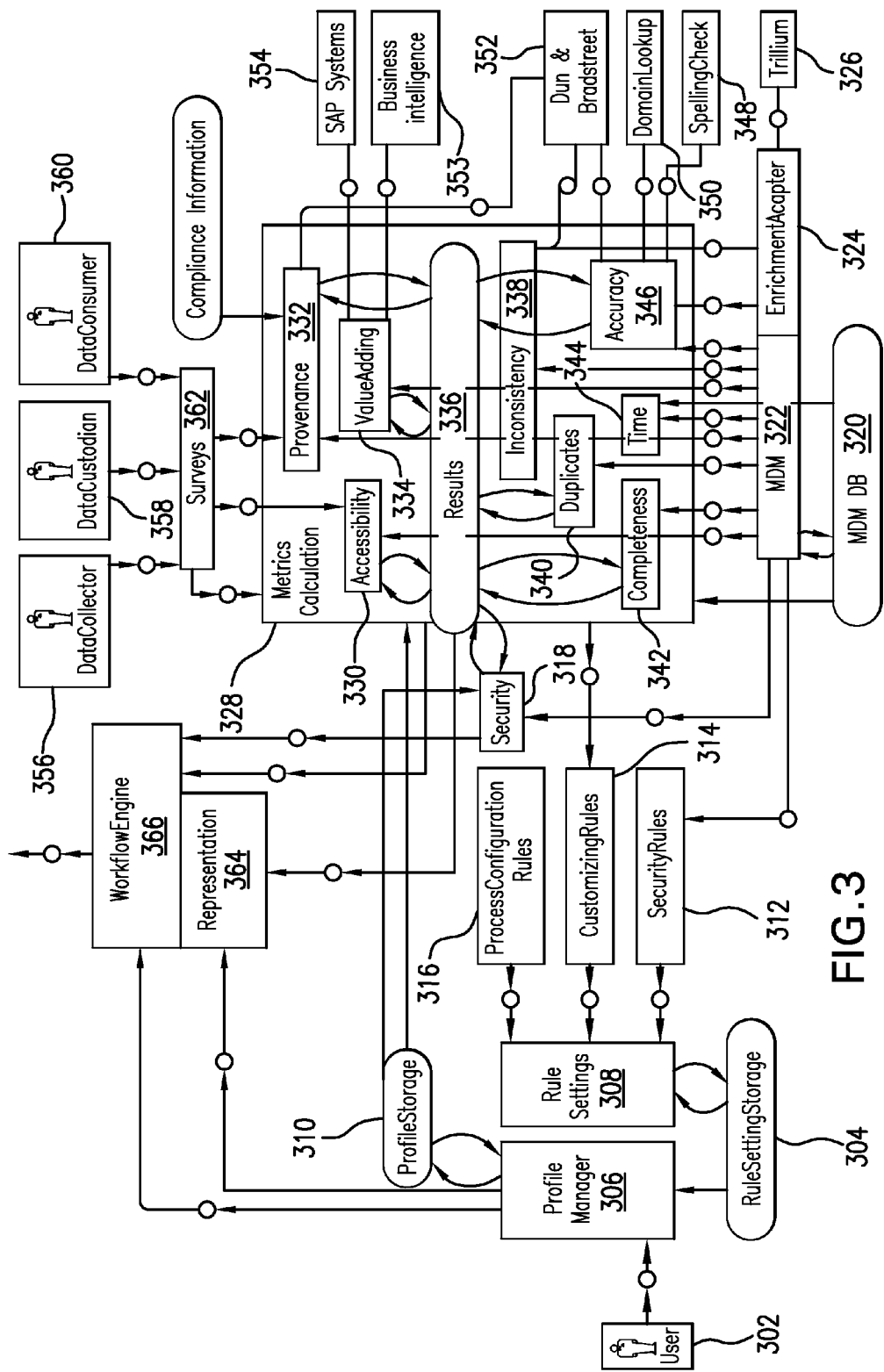
FIG. 3 shows an example of detailed level components included in the system for integration of data quality metrics into enterprise data management processes based on configuration rules and roles according to an embodiment of the present invention.

FIG. 3 shows an example of detailed level components included in the system for integration of data quality metrics into enterprise data management processes based on configuration rules and roles according to one example of the present invention. The example system of FIG. 3 corresponds functionally to that of FIG. 2. A user 302 may run the ProfileManager module 306 to retrieve rule settings from the Rule Setting Storage 304 and combine these rule settings into a profile for storing in the Profile Storage 310. The ProfileManage 306 may also in response to the user request, retrieve profiles from the Profile Storage 310 and modify the profile. A SecurityRules module 312, a CustomizingRules module 314 and a ProcessConfigurationRules module 316 connected to a RuleSettings module 308 may either receive new security rules, customizing rules, or rules for process configuration from the Rule Setting Storage 304. Alternatively, the RuleSettings module 308 may retrieve and modify existing settings in the RuleSettingStorage 304. For example, the CustomizingRules module 314 may retrieve the customizable objects from a MetricsCalculation module 328, and the SecurityRules module may retrieve data and instructions from the MDM 322 which may be connected to a MDM Database 320.

The MetricsCalculation module 328 may retrieve data from MDM 322 or directly from the MDM database 320 to modules included therein, e.g., modules of Accessibility 330, Provenance 332, ValueAdding 334, Inconsistency 338, Duplicates 340, Completeness 342, Time 344 and Accuracy 346. The MetricsCalculation module 328 may also retrieve data from external services provided to the MetricsCalculation module 328 directly or through an EnrichmentAdapter 324. According to an embodiment of the present invention, the EnrichmentAdapter 324 may provide data retrieved from an address validation service, e.g., a Trillium Software application, to the Accuracy module 346 or to the Inconsistency module 338. Additionally, a SpellCheck 348 and a DomainLookup 350 may provide external services of spell check and Internet domain name lookup respectively to the Accuracy module 346. A Dun & Bradstreet DUNS number validation service 352, e.g., via a D&B enrichment adapter, or other such service number may provide external services of validating DUNS number to the Accuracy module 346, the Inconsistency module 338 and the Provenance module 332. A Business Intelligence module 353 and SAP systems 354 may provide external services respectively of data gained from supplier evaluation or information about frequency of use derived from transactions using supplier data to the ValueAdding module 334. A Compliance Information module 364 may provide external services of legal compliance requirements to the Provenance module 332. The MetricsCalculation module 328 may also be provided with an external survey service through a Surveys module 362 for calculating weights. The results from the Surveys module 362 may be based on inputs from a DataCollector module 356, a DataCustodian module 358 and a DataConsumer module 360. The output of the Surveys module 362 may be provided to the Accessibility module 330 and the Provenance module 332 in addition to the MetricsCalculation module 328.

Based on the data retrieved from MDM or directly from MDM database, and the outputs at the modules of Accessibility 330, Provenance 332, ValueAdding 334, Inconsistency 338, Duplicates 340, Completeness 342, Time 344 and Accuracy 346, the MetricsCalculation module 328 may retrieve a profile from the Profile Storage 310 and calculate a result 336 of data quality metrics according to the profile retrieved. Based on the results 336 and security data retrieved from MDM 322 or directly from MDM database 320, a Security module 318 may calculate security metrics according to the profile retrieved from the Profile Storage 310. Based on the data quality results 336 and security metrics, a WorkflowEngine module 366 may make a determination for triggering a workflow process, and a Representation module 364 may convert the data quality results 336 into a representation according to the profile received from ProfileManager module 306.

Figure 4A:
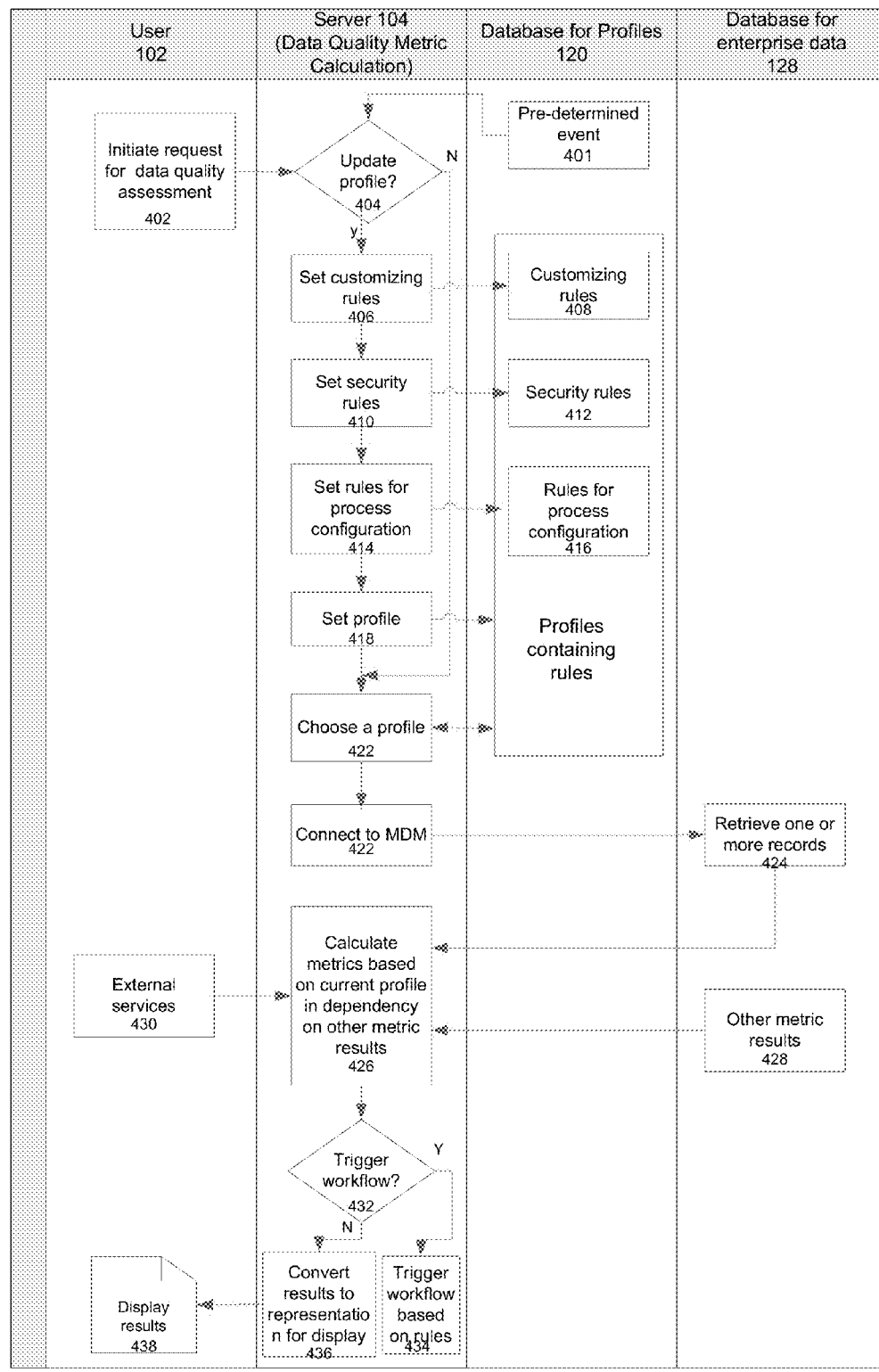
FIG. 4A shows an example cross-functional flowchart of a method for integration of data quality metrics into enterprise data management processes based on configuration rules and roles according to an embodiment of the present invention.

FIG. 4A shows an example cross-functional flowchart of a method for integrating data quality metrics into enterprise data management processes based on configuration rules and roles according to one example of the present invention. A user may first login to the system for calculating data quality metrics based on a role of the user. At 402, a user 102 may initiate a request or at 401, a pre-determined event may initiate a request to a data quality application on a server 104 for assessing the quality of data stored in an enterprise database 128. The request from the user may include information about the data for which the data quality assessment may be performed and a profile containing rules for assessing the data quality and based on which the assessment may be performed. Based on the request, the data quality application may make a determination at 404 whether to update the profile. The profile may be updated because the user specifies a new profile based on new rules or a new combination of rules, or may be updated simply for new type of enterprise data.

If the application decides to update the profile, the user may first set customizing rules 406, 408, security rules 410, 412, and rules for process configuration 414, 416, and then update the profile database 120 by either creating a new profile or updating an existing profile with new rules. At 418, the new profile may be stored in the profile database 120 for future reuse. After the update or if the application determines that the profile does not need update, at 420, the application may choose a profile containing rules for calculating data quality metrics based on user's request and make a connection 422 to the MDM or directly to the MDM database for retrieving data 424 for which the quality check is performed. Then based on the rules provided in the profile, quality metrics for the retrieved data may be calculated 426. The calculation of some the quality metrics may additionally depend on the results of other quality metrics. The calculation of some quality metrics may further require retrieving information from external services 430. With the calculated quality metrics, the application may determine whether to trigger a workflow process 432 according to rules provided for in the profile 434 or convert the results into a representation suitable for displaying 436 to a user at user's terminal 438.

According to an embodiment of the invention, the whole framework of the data quality assessment application may include on the one hand, a rule engine for assessing the quality of the overall security related to that MDM data, and on the other hand the data quality metrics application itself. The data quality metrics application itself may implement the calculation of all different metrics. Two additional engines may be embedded in this application, one for customizing purposes and one for process configuration. The three rule engines may be linked to another engine for managing profile rules where different configurations of the other engines may be saved and combined as different assessment profiles. These profiles may provides the user with an easy tool for managing different types of assessments without having to perform unnecessary reconfiguration in the future.

Figure 4B:
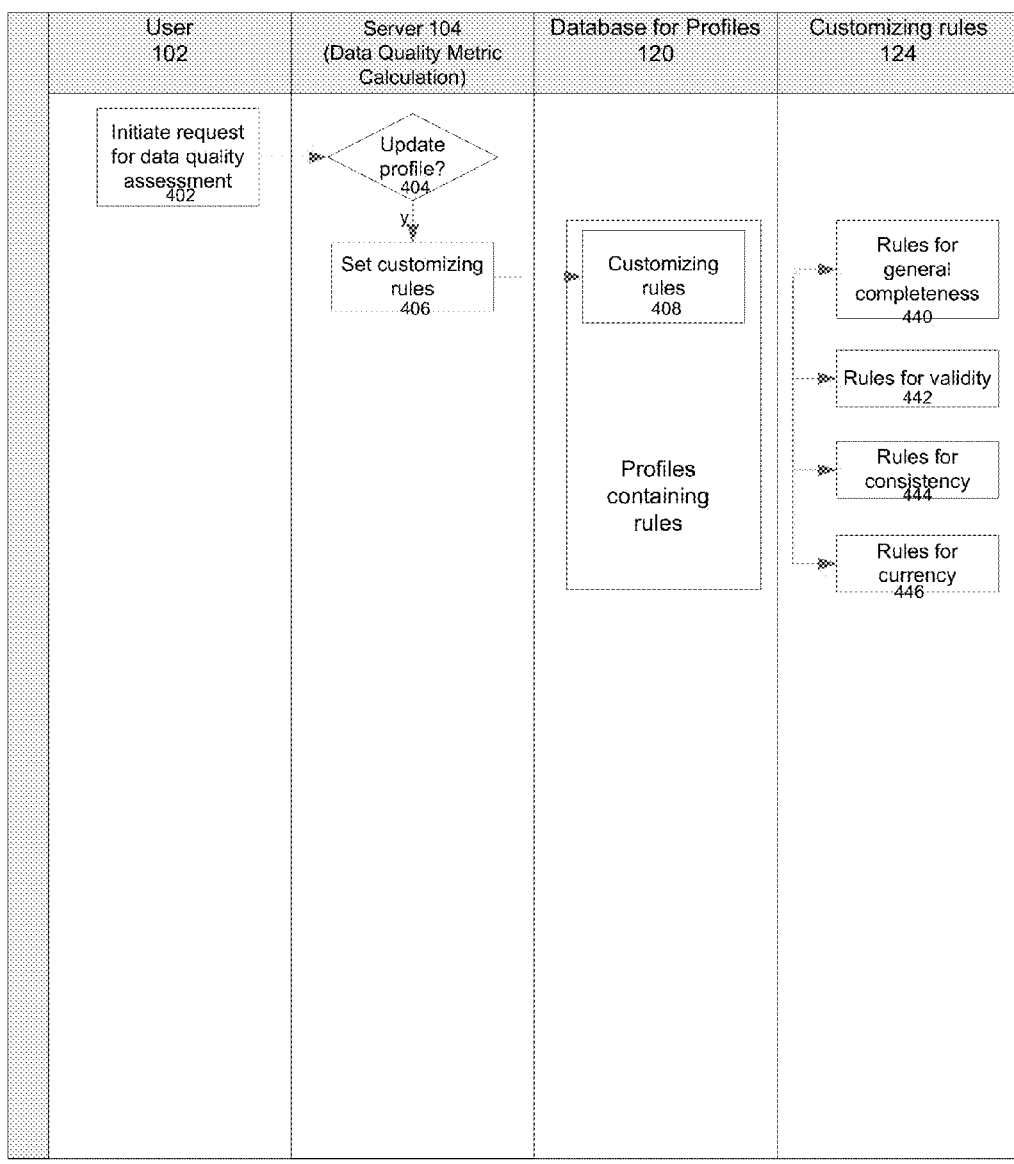
FIG. 4B shows an example cross-functional flowchart for setting customizing rules according to an embodiment of the present invention.

FIG. 4B shows an example cross-functional flowchart for setting customizing rules according to one example embodiment of the present invention. The customizing rules may provide a user with functionality to configure the properties concerning the calculation and may relate to each customizable metric of the calculation model. The user may, for example, customize rules for general completeness 440, validity 442, consistency 444 and currency 446 according to individualized data model. Additionally, the user may specify the weights of importance of each attributes within the data model. The customizing rules may finally be passed to the data quality metric calculation module for calculation of quality metrics according to individual customization.

Although many metrics may be customized, it is for the user or another source (e.g., a lookup table) to decide which parameters fit best into a data model. Initially, standard values may be provided for as default values. FIG. 5 shows an example of rules that are customized for a specific data model with a set of attributes, e.g., including Account Group Code, Account Group Name, Address Time Zone and City etc. The user may customize, e.g., Rule 1 for Validity by specifying requirements in the first and second columns, e.g., for Account Group Code, specifying "Length is max. 4" in the first column and "Consists of Characters" in the second column. The third column may specify the result of applying the rule, e.g., for Account Group Code, resulting "Account Group Code is valid." Similarly, the user may customize, e.g., Rule 2 for Completeness by specifying rules in the first column and results in the second column, e.g., for Account Group Code, specifying the rule as "This attribute is essential to the record" and resulting "High importance."

Figure 4C:
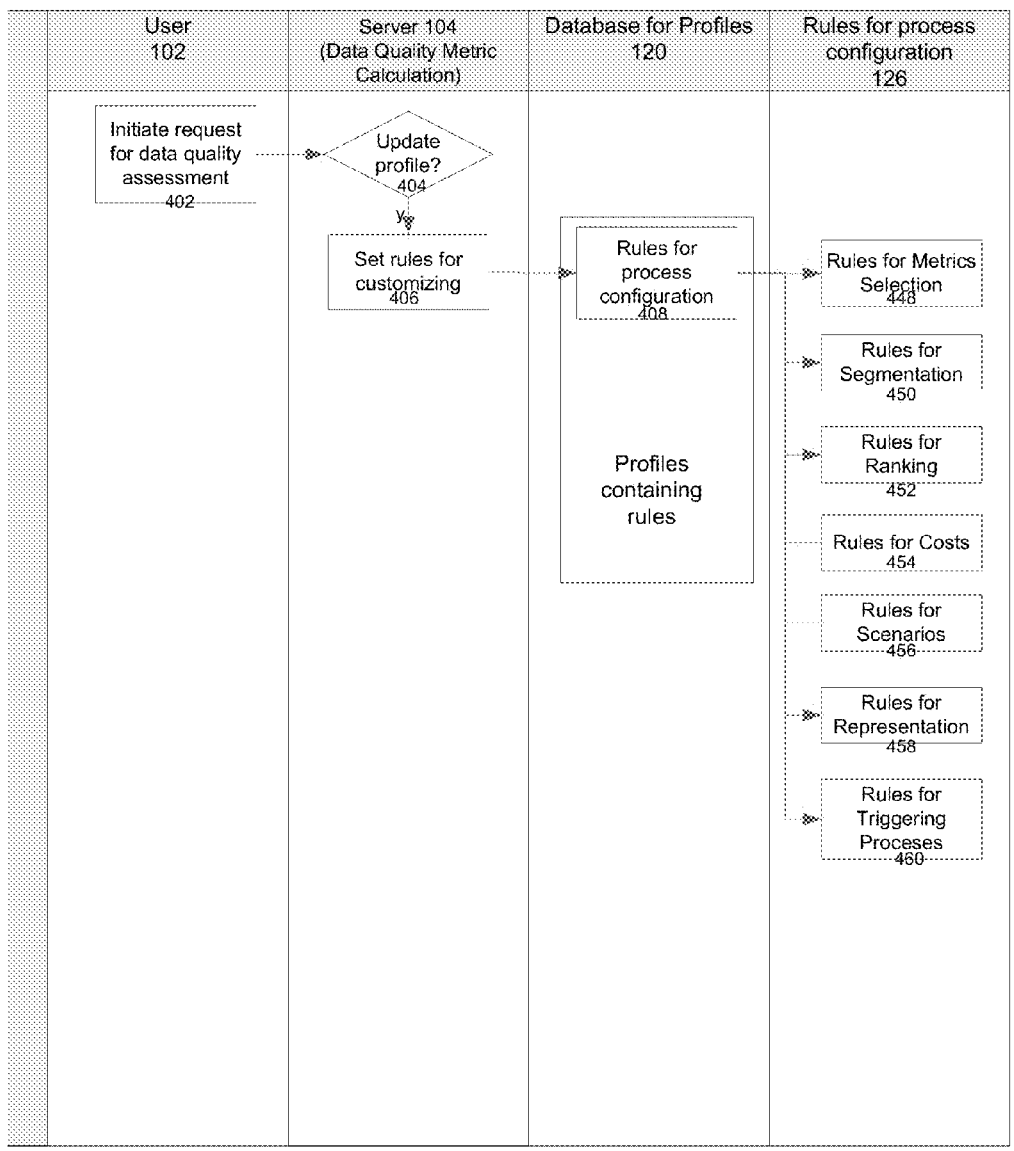
FIG. 4C shows an example cross-functional flowchart for setting rules for process configuration according to an embodiment of the present invention.

FIG. 4C shows an example cross-functional flowchart for setting rules for process configuration according to an example embodiment of the present invention. The process configuration rules may allow a user to configure the assessment according to certain processes, e.g., configuration relating to scenarios of, e.g., creating new records, updating records, regular assessments etc., and/or relating to a selection of metrics 448, segmentation of data 450, ranking of metrics 452, calculating costs of metrics 454, and/or converting to a representation 458.

The module for metrics selection 448 may select a subset of metrics to calculate because not all metrics must be calculated under every scenario. For some scenarios, the application may require to choose only a combination of some of the metrics.

FIG. 6 shows an example embodiment of the present invention whereby a user may choose a selection of metrics shown in the first column from left by activating a check box in the second column. The third column shows the dependency among different metrics, e.g., an activation of Timeliness metric may require the activation of Currency.

Figures 7A, 7B:
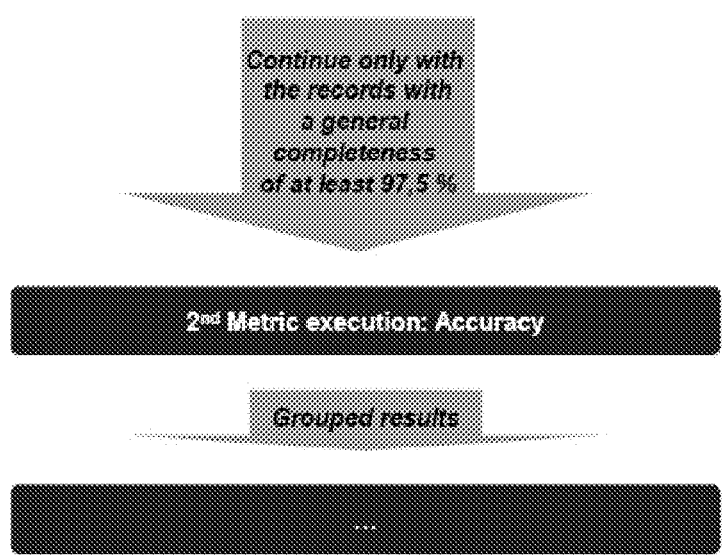
FIGS. 7A-B show an example embodiment where the calculation of data quality metrics depends on the calculation of other data quality metrics.

Sometimes, it may be desirable not to perform a quality assessment on the complete set of data. The module for data segmentation 450 may allow a user to apply quality assessment to only part of the whole set of data records according to data model, metrics or predefined segmentation rules. In one example embodiment as shown in FIGS. 7A and 7B, the data quality assessment application may first calculate all the metrics specified by the Metrics Selection module and according to the profile for a particular metric, e.g., the General Completeness. For each record, FIG. 7A shows the resulting General Completeness metric in terms of percentiles. Based on the results, the module for segmentation may segment the data records for those whose General Completeness is less than 97.5% as shown in FIG. 7B. The criteria or dimensions for segmentation may be based on a single calculated metric as the above discussed General Completeness. In an embodiment, it might be desirable to access only records originated from certain source systems, data models, attributes of data model, or Business Information data. If the total number of records is so large that it is difficult to access all records due to performance or cost reasons, only a random sub-sample of the whole set may be accessed. The random sub-samples may be randomly chosen from a defined number of records.

Some metrics may depend on the calculation of other metrics according to one embodiment of the present invention. Moreover, there may be a ranking in terms of the importance of metrics. An order for processing may be decided based on the dependency and importance factor among metrics. A rule for a metric may be derived in dependency on the previous metrics results. Additionally, ranking rules may be defined according to the rules set up for segmentation if they have been chosen.

Figure 8A:
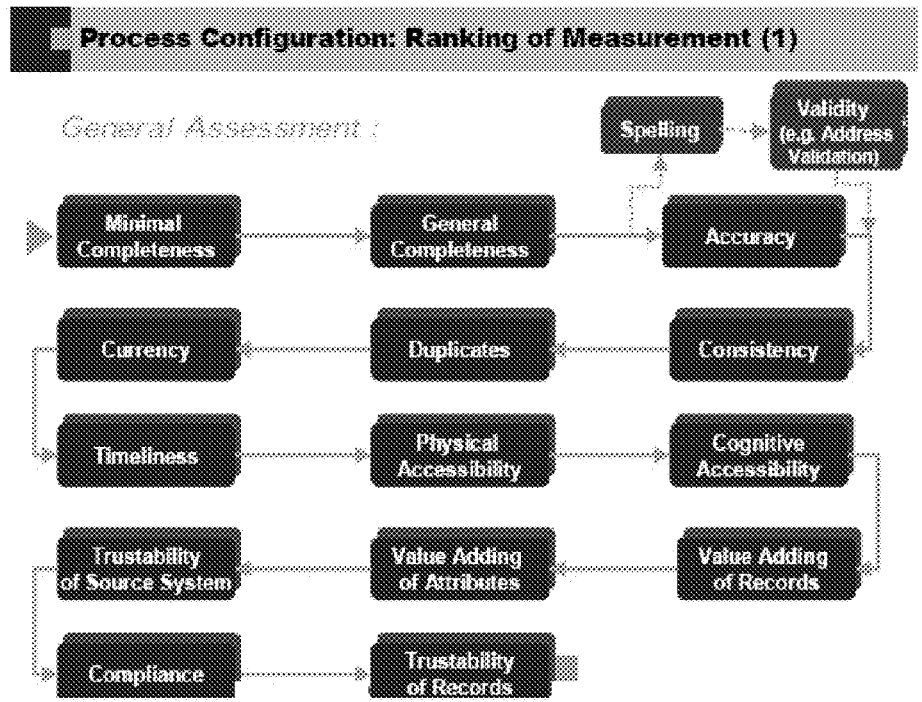
Figure 8B:
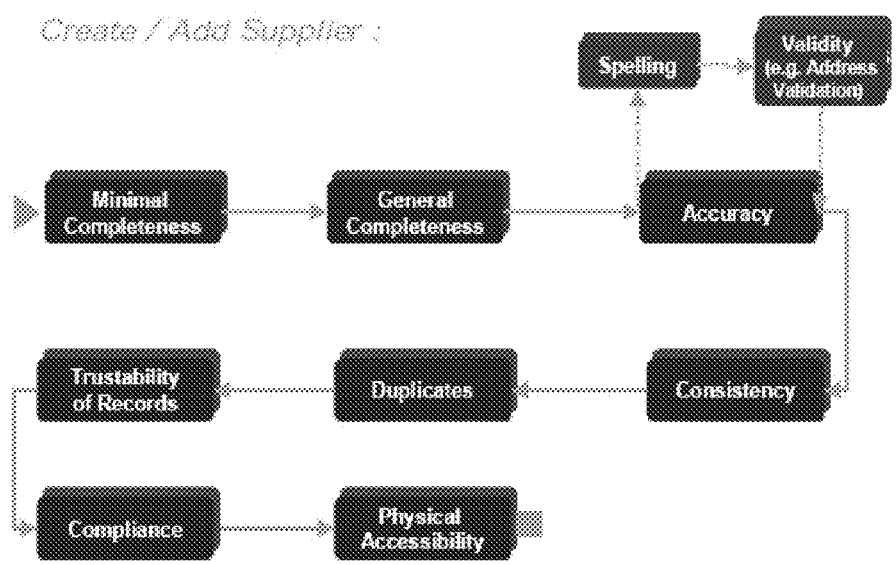
Figure 8C:
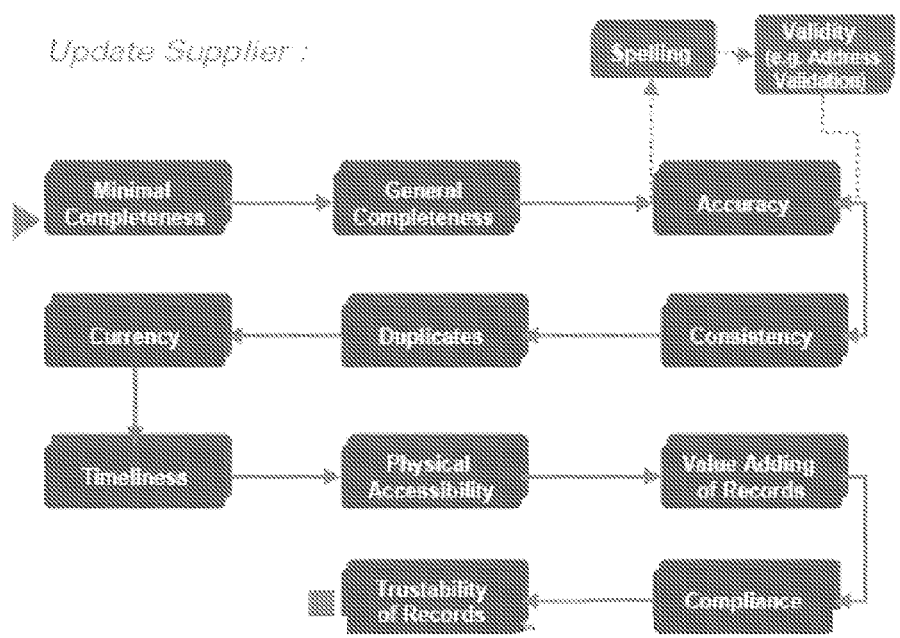
Figure 8D:
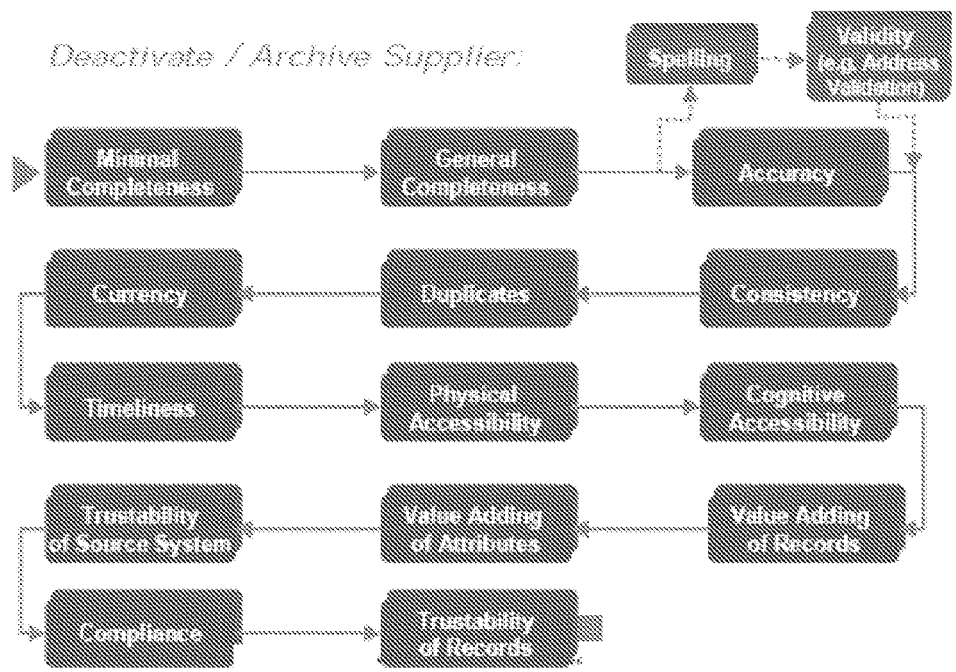
Figure 8E:
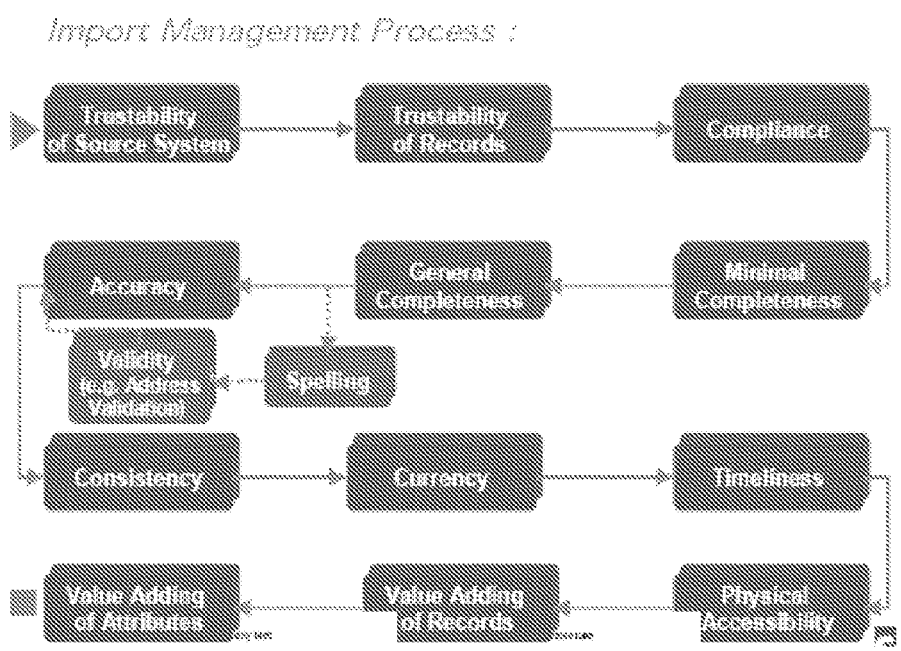

FIGS. 8A-F show example embodiments of ranking of metrics measurements under different scenarios, e.g., FIG. 8A for a general assessment, FIG. 8B for create/add supplier, FIG. 8C for update supplier, FIG. 8D for deactivate/archive supplier, FIG. 8E for an import management process, and FIG. 8F for a distribution management process.

In another example embodiment, FIG. 9 shows the ranking of measurement may also depend on the results of previously determined metrics. For example, when the General Completeness metric shows that an address is incomplete, the application may not validate the address. Or, when General Completeness and Accuracy are very low, the application may not check for duplicates.

The process configuration module may have different setups for different scenarios which may require different assessments. A user may define any scenario through the module for scenario 456. Furthermore, the module may define sub-scenarios to the regular assessment, e.g., one small monthly assessment and one completely detailed annual assessment. In one example embodiment, FIG. 10A shows scenarios of basic contexts. For each scenario, one or more rule may be generated for the scenario. For example, for Vendor Search and Select scenario, a rule of "Do not evaluate cognitive accessibility" may result. For Multi Stage Create/Add Supplier scenario, rules of "Do not check value adding and currency," "Do not check trustability of source system," and "Do not evaluate cognitive accessibility" may be generated. In another example embodiment, FIG. 10B shows additional contexts may be provided to the basic contexts of scenarios. For example, in a scenario of "Distribution Management Process," an additional context of "Distribute records to other system" may be provided and a rule of "Do not check accessibility" may be generated. In another example, a scenario of Regular Quality Assessment may include two sub-scenarios, each of which may have different contexts and generate different rules. For example, the first sub-scenario may include contexts of "High timeliness of record" and "Last address validation has been performed within a certain period," and generate a rule of "Do not validate address." The second sub-scenario may include a context of "No major basic changes since last assessment" and generate a rule of "Do not evaluate cognitive accessibility."

Each quality assessment may be associated with a cost, e.g., time for user interaction or resources according to one example embodiment of the present invention. The cost may be within a predefined range and may be weighed against the benefit of the assessment. Cost factors may be direct cost factors or indirect cost factors. Direct cost factors may include performance factor, e.g., time and resources, processing cost factor, e.g., automation vs. manual execution, level of detail factor, e.g., quantity vs. detailed, and security factor. Indirect cost factors may include benefits, e.g., missed out benefits due to wrong information, additional cost factor, and contract factor, e.g., risk of losing a supplier. The indirect cost factors may also be viewed as risk factors. Failure of critical values for certain metrics, e.g., address validity, consistency etc., may lead to a warning for the user. In one possible case, a purchaser may choose a supplier for a new transaction. During that selection, the incompleteness of the banking information may be determined. Thus, the purchaser may receive a warning that this supplier information has to be updated first, or that there are no transaction possible.

In an example embodiment of the present invention, FIG. 11A shows that the direct cost rules may be influenced by ranking. For example, when the test set of records is huge, rules of "Do not prompt user to confirm spelling errors" and "Do not request user interaction for finding duplicates" may be generated. In another example embodiment of the present invention, FIG. 11B shows rules influenced by indirect cost factors. For example, in the context of minimal incompleteness, rules of "Direct contact is not possible" and "Customer might be lost due to missing contact" may be generated.

According to scenarios, a user or other entity may need to receive results of the assessment in different ways, e.g., for it may not always be necessary to provide him with a very detailed report. The representation may also depend on the quality of data. For example, a data of low quality may require a detailed report for the user to find out why. According to an embodiment of the present invention, FIGS. 12A and 12B show representation rules generated according to scenarios and/or sub-scenarios. For example, the scenario of Import Management Process may include two sub-scenarios of one single record and set of records. For the sub-scenario of one single record, a representation rule of "Only prompt user to correct erroneous data for that record" may be generated, and for set of records, representation rules of "Bundle and group the correction requests and present them to the user after the whole import has been finished" and "Offer a detailed report containing all the quality results for that import" may be generated.

Based on the results of assessment, rules chosen and the present scenario, the data quality assessment application may trigger different workflows. The selection of a workflow may depend on many factors, e.g., weights, selection of metrics, scenario and result values etc. According to one example embodiment of the present invention, FIGS. 13A and 13B show different workflow triggered under different scenarios and conditions. For example, a workflow process of "Warn user or request an update" may be triggered under a scenario of Search and Select for a condition that specified metric is below a critical value. In another example, workflows of "Inform user and request correction" and "Data cleansing and enrichment process" may be triggered under a scenario of Multi Stage Create/Add Supplier for a condition that accuracy, consistency, duplication or accessibility problem occurs.

Figure 4D:
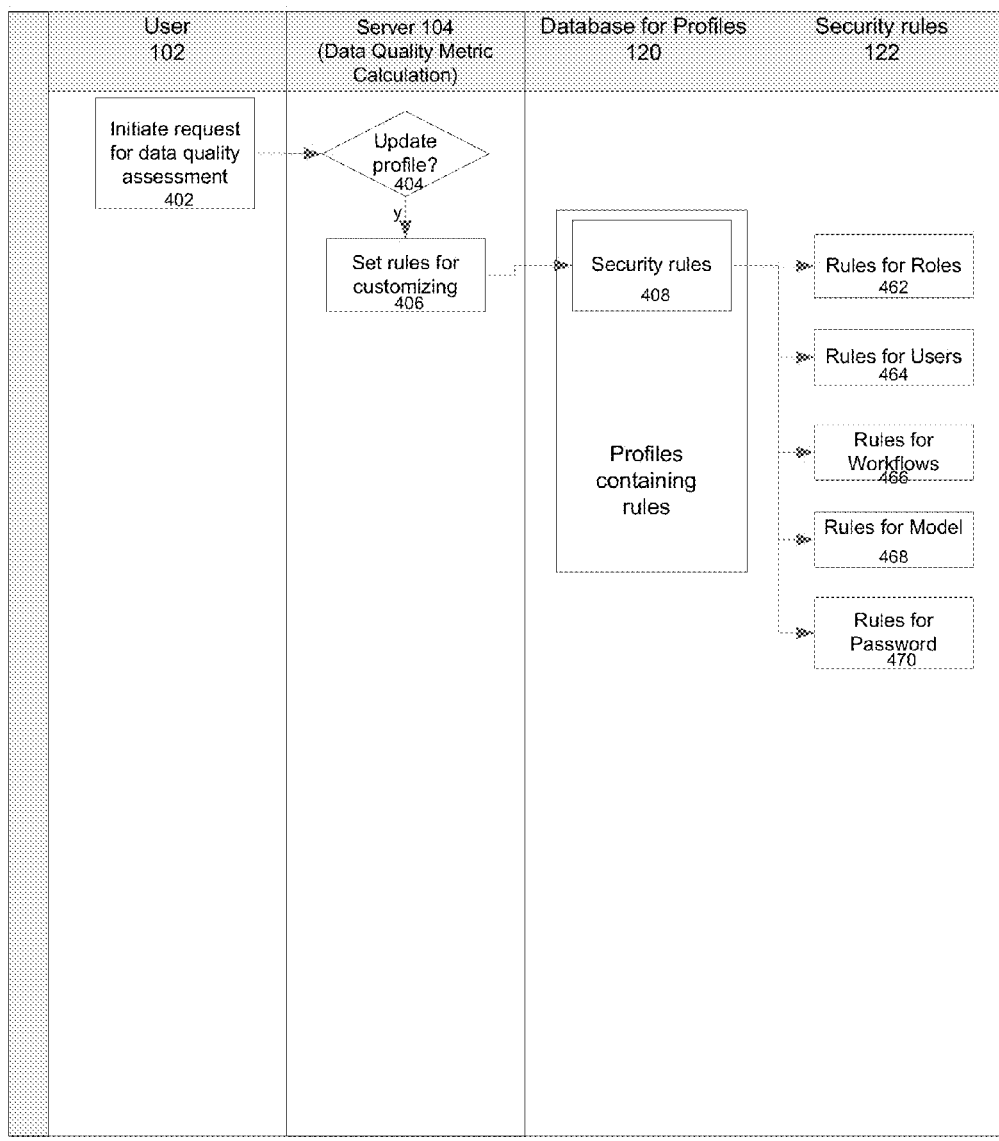
FIG. 4D shows an example cross-functional flowchart for setting security rules according to an embodiment of the present invention.

FIG. 4D shows one example cross-functional flowchart for setting security rules according to one example embodiment of the invention. Security metrics are surrounding factors that may affect the data quality indirectly. For example, if the overall security level is too low, e.g., password restrictions are too low, or roles and access rights are not defined properly, the MDM data may be modified and corrupted easily. On the other hand, if the security level is set too high, it may be too difficult even for the authorized users to access and modify the data. Thus, the MDM data quality may suffer as well.

In an embodiment of the present invention, security metrics may relate to users, roles of users, data models, passwords and workflows. Rules for passwords 470 may include, e.g., "must not be initial," "must not contain user name or full name (neither the complete string nor any substrings)," "must use at least three of the four available character types: lower-case letters, upper case letters, numbers and symbols," and "minimum length: 8 characters." Rules for roles 462 may include, e.g., "at least one role has to have restricted access rights (for both functions and fields)" and "technical and business side administrators should be different (technical administrator should not be able to see Vendor records)." In an embodiment, rules for users 464 relate to questions such as "which persons have administration right," "is there a way to link it to any employee function" and what are the setup rules for that mapping." They may also relate to factors, e.g., check validity and timeliness of role assignment (cross check employee data for functional changes and time stamp of role assignment), or whether user name is identical to its corresponding company user ID. Rules for workflow 466 may relate to the specification of which attribute changes that require an approval, approval responsibilities and approval process. Rules for data model may relate to whether Application Programming Interfaces (APIs) are protected and/or whether it is possible to access and modify the data via APIs. In an example embodiment according to the present invention, FIG. 14 shows security aspects and high level practices for security. These practices may be further defined and/or supplemented with additional rules, e.g., those in regard to the organizational structure of the specific company.

Fully setting up above discussed rules may require significant efforts. Therefore, it may not be efficient to repeat the setting up process for each assessment scenario. To reuse and streamline the setting up process, a profile engine is configured in response to a user request, to create profiles of settings for later reuse. To create a profile, the first step may include configuring different rules for security, customizing and the process configuration. Then those settings may be saved separately. Finally, those settings may be combined, e.g., one for each category, to a profile. In this way, both the single rule engine settings and the profiles are reusable, and hence, convenient to handle a set of different assessment without having to reconfigure everything for each new assessment. A profile may include aspects of assessment frequency, e.g., small monthly check or detailed annual check, source system and data model, e.g., SAP ECC, SRM, and scenarios, e.g., Vendor Search and Select, Create/Add Supplier, Update Supplier, Deactivate/Archive Supplier, Import Management Process, Distribution Management Process, Data Cleansing/Enrichment and Refresh Process.

Figure 4E:
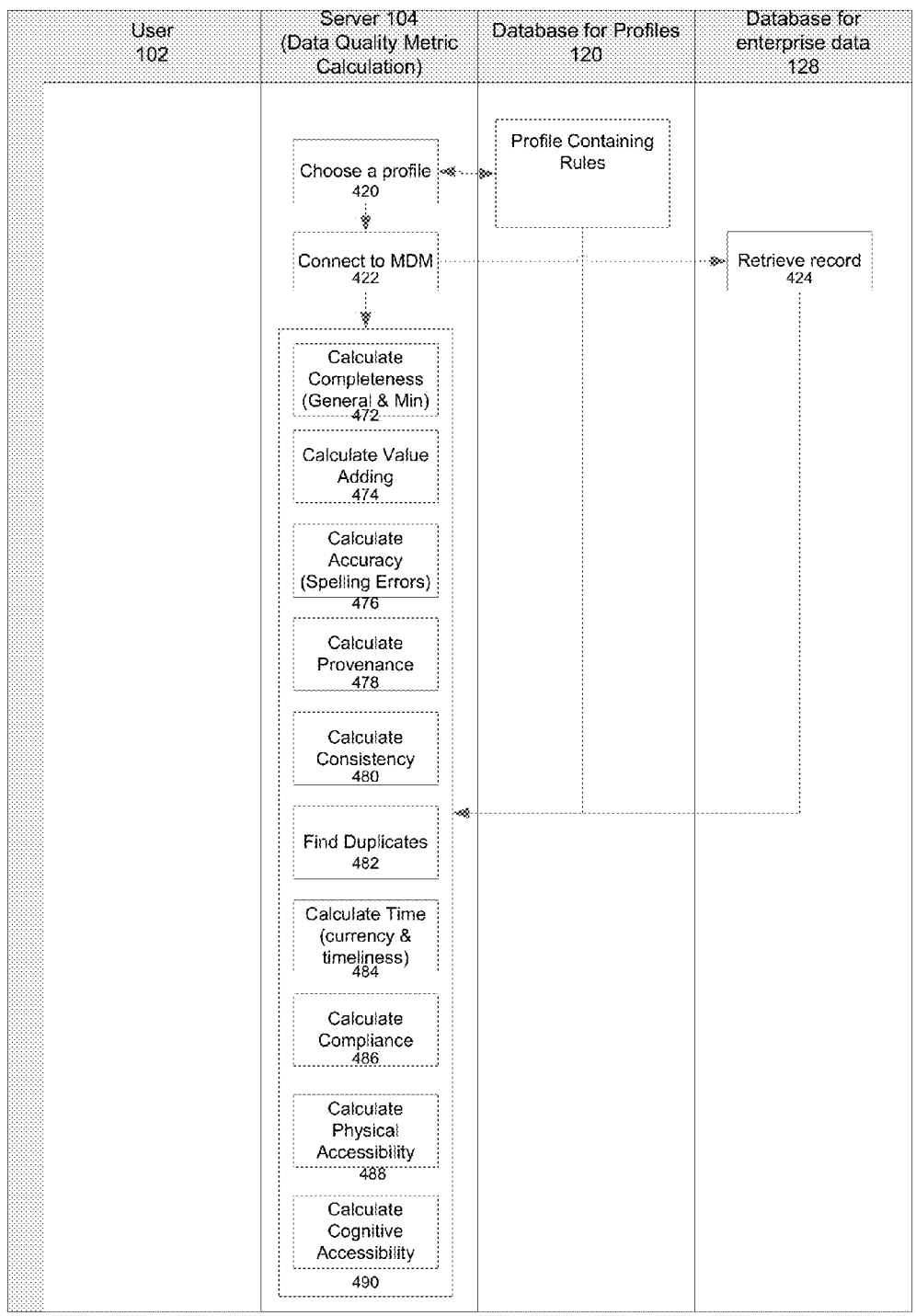
FIG. 4E shows an example cross-functional flowchart for calculating data quality metrics according to an example embodiment of the present invention.

FIG. 4E shows an example cross-functional flowchart for calculating data quality metrics according to an embodiment of the present invention. In this example embodiment, the data quality calculation module may include modules for calculating minimum completeness 472, general completeness 474, accuracy (e.g., spelling error) 476, provenance 478, consistency 480, duplicates 482, timeliness 484, compliance 486, physical accessibility 488 and cognitive accessibility 490.

In an embodiment of the present invention, the module for calculating accuracy 476 calculates either syntactic accuracy and/or semantic accuracy. For example, FIG. 15A shows a main table of a vendor who may have two names, e.g., Owens Electric & Solar and J & J Owens Electric, Inc., related to the company and thus have two records created for it. In one example embodiment, the syntactic accuracy may be measured, e.g., in terms of edit distance. The edit distance between string a and string b may be calculated based on the cost of converting from a to b. A cost of 1 may be associated with either change, or deletion, or insertion of a letter. For example, the edit distance between "Owens Electric & Solar" and "J & J Owens Electric, Inc." as shown in FIG. 15B is 9. The user may specify a rule that defines up to which cost (in relation to the length of the longer string) the data shall be regarded as similar. In an alternative example embodiment, the comparison function may be an identity function. An identity function has a result value "true" only if two strings are identical. Otherwise, the result value is "false."

In an embodiment of the present invention, the accuracy may be measured in terms of semantic accuracy or record matching of whether Record A and Record B refer to the same real world object. A union of Record A and Record B may be represented as Record A×Record B={(a, b)|a ∈ Record A and b ∈ Record B}. A subset of matching field(s) may be represented as M={(a, b)|a=b, a ∈ Record A and b ∈ Record B}. A subset of nonmatching field(s) may be represented as U={(a, b) | a<>b, a ∈ Record A and b ∈ Record B}. The semantic distance is based on the ratio of U/M where if U/M=0, the Records A and B are semantically identical; or if U/M≠0 (and M≠0), the Records A and B are not semantically identical.

In an embodiment of the present invention, the Provenance metric may be calculated 478 as an individual assessment by defining weighs for different data sources and establishing a ranking.

Figures 16, 17:
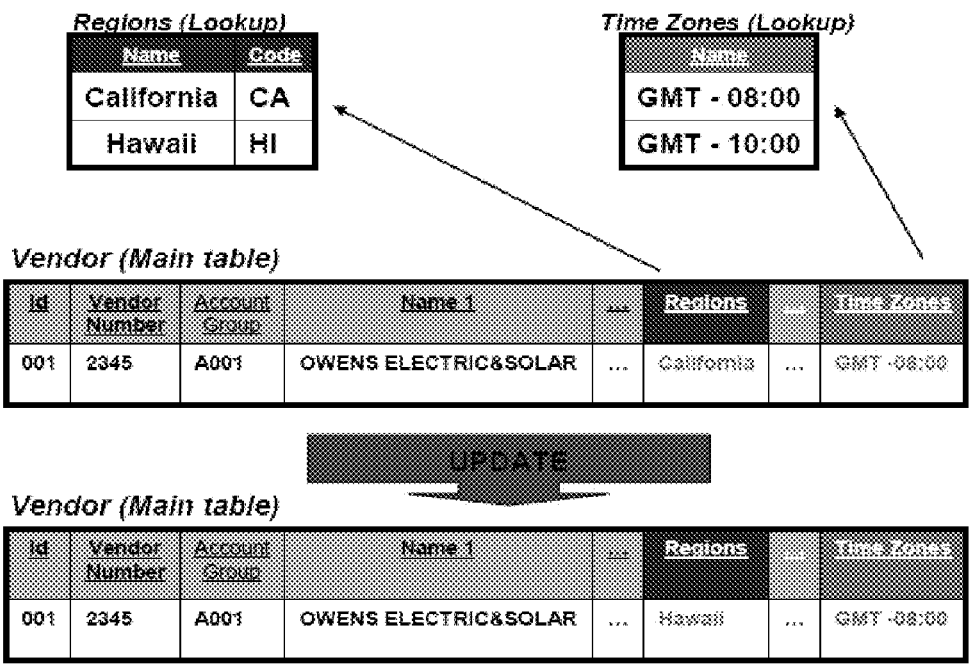
FIG. 16 shows an example that an incomplete update of the database may cause an inconsistency among attributes.
FIG. 17 shows an example of vendor main table where one field is ambiguous because different users enter totally different data.

In an embodiment of the present invention, an inconsistency may be the result of an incomplete update. For example, FIG. 16 shows that an incomplete update of the database may cause an inconsistency in the Regions and Time Zones attributes.

In an embodiment of the present invention, the calculation of the Time metric include determining Currency and Timeliness factors. The Currency may relate to the frequency of change of an attribute. The frequency of change may be calculated for data with stable change frequency or with flexible change frequency by calculating an average. In an embodiment, a change of a company's address, e.g., the city, may be traced from the metadata of the database. Rules may be applicable to the Currency, e.g., the city of a company may change within an average of five years, but it may not change three times a year. The Timeliness may be related to availability of a data item. In an embodiment of the present invention, the module for Time metric checks currency and then check if the attribute DataCreationTime less than TimeDataNeeded. If so, the module may search for time stamp that shows when accessing the data has been tried for the first time. The timestamp TimeDataNeeded may be an indication when the user might have tried to access the data item for the first time, e.g., when the user tried for the first time to read the address of a certain record. The timestamp may be created even during the initiation of a field.

In an embodiment of the present invention, the calculation of metric for Cognitive Accessibility 490 may measure how easy it is for a user to understand the data. FIG. 17 shows an example Vendor main table where one field, e.g., Account Group, may be ambiguous because different users enter totally different data. For situation where there is a lookup table behind the field, the module for Cognitive Accessibility may check editing rights for that table to look for persons who are responsible. In an embodiment, if a lookup table is used, it may not be possible for the user to enter any data as the user understands. For example, one user may enter numerical values while other users may enter alphanumerical values. In a case like this, the right to editing may be examined to ensure that only users with responsibilities may edit the lookup table.

In an embodiment of the present invention, the metric of Value Adding is calculated 474 based on frequency of use. For example, FIG. 18 shows high frequency of use of the e-mail address field and low frequency of use of the train station field.

In an embodiment of the present invention, the metric of Completeness is calculated for general completeness and minimum completeness 472. The general completeness may be related to the completeness of all data fields. However, some data fields may be more important than others. Therefore, the minimum completeness may be related to a minimum set of important data fields. For example, in FIG. 19, the phone number of a company may be considered more important than fax number or e-mail address. Therefore, the metric for minimum completeness may require a determination of the completeness of phone number, and the general completeness may require a determination of the completeness of phone number, fax number and e-mail address of the company.

In an embodiment of the present invention for address validation, the Data Quality Metric Calculation module residing on the server 104 may first check for completeness to determine whether all necessary fields, e.g., Name 1, Street, House Number, City, City Postal Code, Country, and Phone Number, are ascertained. Next, the module may check for consistency to determine, e.g., whether the city and the related city postal code are consistent against database with city information, or whether the city exists in the country. Then, the module may check for the timeliness and concurrency to determine, e.g., when has the last update on the address taken place and the time stamps against the average change frequency. Finally, the module may check accuracy to determine, e.g., whether the data is semantic and syntactic correct, or whether all data entries are in valid formats. FIG. 20 shows an example table of data entries and their corresponding format specifications. FIG. 21 shows an example result of applying the above discussed data quality metric modules to data in an enterprise database. In this example, a check for general completeness may determine that the fields for House Number and Phone Numbers are incomplete. A check for consistency may determine that the fields for City, City Postal Code and Country are consistent. A check for accuracy may determine that the fields for Name 1 and Street are not accurate. Finally, a check for time may determine that the last update on address was two and half years ago.

In another example embodiment of the present invention, the quality metrics may be provided with a default weighting through a survey and calculated with a weighting system. An example survey is herein attached in Appendix 1. A checkbox table shown in the survey may be provided to a user who may be in a role as, e.g., a data collector 356, a data custodian 358, or a data consumer 360 to fulfill the survey. The user may elect a weight for each attribute based on his view, e.g., a 75% weight on Validity/No Duplicate, which may be used for further calculation. The survey may also seek for user inputs on the level of importance for quality metrics, e.g., consistency and completeness.

Based on the weights derived from surveys, a target value of overall data quality may be calculated from a weighted assessment of each individual quality metric. In one example embodiment of the present invention, the accuracy metric may be evaluated as a weighted average of validity, duplicates and proper spelling attributes from the survey, e.g., $R_{Accuracy}=75/150*R_{Validity}+50/150*R_{Duplicates}+25/150*R_{ProperSpelling}=0.5*R_{Validity}+0.33*R_{Duplicates}+0.17*R_{Properspelling}$, where the total weight X=Validity (Average Weigh)+No Duplicates (Average Weigh)+Proper Spelling (Average Weigh)=75+50+25=150.

The provenance metric may be evaluated as a weighted average of DUNS Number, Trustable Source System, Timely Data attributes from the survey, e.g., $R_{Trustability}=62.5/150*R_{DUNS}+37.5/150*R_{Source}+50/150*R_{Time}=0.42*R_{DUNS}+0.25*R_{Source}+0.33*R_{Time}$, and $R_{Provenance}=$ Trustable Vendor Record$*R_{Trustability}+$Trustable Source System$*R_{Source}=0.75*R_{Trustability}+0.25*R_{Source}$, where the total weight Y=Valid DUNS Number (Average Weighting)+Trustable Source System (Average Weighting)+Timely Data (Average Weighting)=62.5+37.5+50=150.

Similarly, the accessibility metric may be evaluated as an weighted average of cognitive accessibility, physical accessibility, e.g., $R_{Accessibility}=$Cognitive Accessibility$*R_{CognitiveAcc}+$Physical Accessibility$*R_{PhysicalAcc}=0.25*R_{CognitiveAcc}+0.75*R_{PhysicalAcc}$. Based on the number of levels of importance, the consistency and completeness may be evaluated as weighted averages of different level of importance. For example, for a survey of two consistency levels, a weighted average consistency may be evaluated as e.g., $0.75*a+0.25*b$ where a and b represent consistencies at each level, and for a survey of four completeness levels, a weighted average completeness may be evaluated as e.g., $0.4*a+0.3*b+0.2*c+0.1*d$, where a, b, c, and d represent completeness at each level.

The overall data quality value target may be a weighted average of all targets of each metric, evaluated as $R=60/300*R_{Accuracy}+30/300*R_{Provenance}+70/300*R_{Consistency}+60/300*R_{Completeness}+35/300*R_{Time}+45/300*R_{Accessibility}=0.2*R_{Accuracy}+0.1*R_{Provenance}+0.23*R_{Consistency}+0.2*R_{Completeness}+0.12*R_{Time}+0.15*R_{Accessibility}$, where the total weight may be X=Accuracy (Average Weighting)+Provenance (Average Weighting)+Consistency (Average Weighting)+Completeness (Average Weighting)+Time (Average Weighting)+Accessibility (Average Weighting)=60+30+70+60+35+45=300.

The various computer systems described herein may each include a storage component for storing machine-readable instructions for performing the various processes as described and illustrated. The storage component may be any type of machine readable medium (i.e., one capable of being read by a machine) such as hard drive memory, flash memory, floppy disk memory, optically-encoded memory (e.g., a compact disk, DVD-ROM, DVD±R, CD-ROM, CD±R, holographic disk), a thermomechanical memory (e.g., scanning-probe-based data-storage), or any type of machine readable (computer readable) storing medium. Each computer system may also include addressable memory (e.g., random access memory, cache memory) to store data and/or sets of instructions that may be included within, or be generated by, the machine-readable instructions when they are executed by a processor on the respective platform. The methods and systems described herein may also be implemented as machine-readable instructions stored on or embodied in any of the above-described storage mechanisms.

Although the present invention has been described with reference to particular examples and embodiments, it is understood that the present invention is not limited to those examples and embodiments. Further, those embodiments may be used in various combinations with and without each other. The present invention as claimed therefore includes variations from the specific examples and embodiments described herein, as will be apparent to one of skill in the art.

What is claimed is:

1. A computer-implemented method for automatically assessing data quality of data stored in an enterprise database comprising:
in response to a request, choosing a profile from a list of profiles stored in a profile database in a memory based on the request, wherein the profile includes a set of rules for calculating a plurality of data quality metrics, the plurality of data quality metrics including at least one of completeness, accuracy, provenance, consistency, cognitive accessibility, and currency;
receiving at least one data record from at least one enterprise database;
calculating, by a processor, the plurality of data quality metrics of the at least one data record in an order and based on the set of rules for calculating the plurality of data quality metrics, wherein the set of rules for calculating at least one of the plurality of data quality metrics is defined based on a previously calculated data quality metric, each of the plurality of data quality metrics are ranked according to an importance ranking, and the order in which the plurality of data quality metrics are calculated depends upon the importance ranking;
determining, by the processor, whether a trigger for triggering at least one workflow process occurs based on the calculated plurality of data quality metrics and rules for triggering the at least one workflow;
converting, by the processor, at least one of the calculated plurality of data quality metrics to a representation for display; and
responsive to occurrence of the trigger, triggering by the processor the at least one workflow process, wherein the at least one workflow process includes at least one of providing an output message related to the at least one data record, requesting an input of data to the at least one data record, and processing the at least one data record.

2. The method of claim 1, wherein the request is made by at least one of: a user and a pre-determined event.

3. The method of claim 1, wherein the profile includes at least one of a customizing rule, a security rule, and a rule for process configuration.

4. The method of claim 3, wherein the security rule includes at least one rule for at least one of role, user, workflow, model, and password.

5. The method of claim 3, wherein the rule for process configuration includes at least one rule for at least one of: metrics selection, segmentation, ranking, cost, scenario, representation and triggering process.

6. The method of claim 2, further comprising:
in response to the request by the user or triggered by the pre-determined event, making a determination whether to update the list of profiles stored in the profile database: if so,
providing settings to each of the one or more of customizing rules, security rules and rules for process configuration based on the request from the user; and
saving the settings to each of the at least one customizing rule, security rule and rule for process configuration as an item of the list of profiles in the profile database.

7. The method of claim 1, wherein the calculation of at least one data quality metric is based on data from external services.

8. The method of claim 7, wherein the external services include at least one of a docketed company name database, a spell check database, a domain name lookup database, and legal compliance information.

9. The method of claim 1, wherein the at least one workflow process includes informing the user about erroneous data.

10. The method of claim 1, wherein the at least one workflow process include prompting the user to correct erroneous data.

11. The method of claim 2, wherein the request by the user or by the pre-determined event includes a scenario of the request.

12. The method of claim 11, wherein the scenario includes sub-scenarios.

13. The method of claim 12, wherein execution of the set of rules for calculating data quality metrics and for triggering workflow processes depends on at least one of the scenarios and sub-scenarios.

14. The method of claim 1, further comprising:
calculating an overall target assessment value for the at least one data record based on target values for the at least one data quality metric, wherein the overall target assessment value is a weighted average of the target values for the at least one data quality metric, and wherein the overall target assessment value is used for assessing the data quality of the at least one data record.

15. A system for automatically assessing data quality stored in an enterprise database, comprising:
a memory;
a processor configured to execute program instructions for:
in response to a request, choosing a profile from a list of profiles stored in a profile database based on the request, wherein the profile includes a set of rules for calculating a plurality of data quality metrics, the plurality of data quality metrics including at least one of completeness, accuracy, provenance, consistency, cognitive accessibility, and currency;
receiving at least one data record from the enterprise database;
calculating the plurality of data quality metrics of the at least one data record in an order and based on the set of rules for calculating the plurality of data quality metrics, wherein the set of rules for calculating at least one of the plurality of data quality metrics is defined based on a previously calculated data quality metric, each of the plurality of data quality metrics are ranked according to an importance ranking, and the order in which the plurality of data quality metrics are calculated depends upon the importance ranking;
determining whether a trigger for triggering at least one workflow process occurs based on the calculated plurality of data quality metrics and rules for triggering one or more workflow processes;

converting at least one of the calculated data quality metrics to a representation for display; and responsive to occurrence of the trigger, triggering the at least one workflow process, wherein the at least one workflow process includes at least one of providing an output message related to the at least one data record, requesting an input of data to the at least one data record, and processing the at least one data record.

16. The system of claim 15, wherein the request is by at least one of a user and a pre-determined event.

17. A non-transitory computer-readable medium including instructions adapted to execute a method for automatically reconciling an enterprise database, the method comprising:

in response to a request by a user or by a pre-determined event, choosing a profile from a list of profiles stored in a profile database based on the request, wherein the profile includes a set of rules for calculating a plurality of data quality metrics, the plurality of data quality metrics including at least one of completeness, accuracy, provenance, consistency, cognitive accessibility, and currency;

receiving at least one data record from the enterprise database;

calculating the plurality of data quality metrics of the at least one data record in an order and based on the set of rules for calculating the plurality of data quality metrics, wherein the set of rules for calculating at least one of the plurality of data quality metrics is defined based on a previously calculated data quality metric, each of the plurality of data quality metrics are ranked according to an importance ranking, and the order in which the plurality of data quality metrics are calculated depends upon the importance ranking;

determining whether a trigger for triggering at least one workflow process occurs based on the calculated plurality of data quality metrics and rules for triggering one or more workflow processes;

converting at least one of the calculated plurality of data quality metrics to a representation for display; and responsive to occurrence of the trigger, triggering the at least one workflow process, wherein the at least one workflow process includes at least one of providing an output message related to the at least one data record, requesting an input of data to the at least one data record, and processing the at least one data record.

18. The method of claim 1, wherein the accuracy metric is measured based on one of syntactic accuracy and semantic accuracy.

19. The method of claim 1, wherein the at least one data quality metric further includes at least one of a consistency metric that measures whether an update of the enterprise data is complete, a cognitive accessibility metric that measures an easiness to understand the data, and a currency metric that measures a frequency of change of data attributes, and a provenance metric that is calculated by defining weights for different data sources.

20. The method of claim 19, wherein the at least one data quality metric further includes at least one of a completeness metrics and an accuracy metrics.

21. The system of claim 15, wherein the accuracy metric is measured based on one of syntactic accuracy and semantic accuracy.

22. The system of claim 15, wherein the at least one data quality metric further includes at least one of a consistency metric that measures whether an update of the enterprise data is complete, a cognitive accessibility metric that measures an easiness to understand the data, and a currency metric that measures a frequency of change of data attributes, and a provenance metric that is calculated by defining weights for different data sources.

23. The system of claim 22, wherein the at least one data quality metric further includes at least one of a completeness metrics and an accuracy metrics.

24. The computer-implemented method of claim 1, wherein the order in which the plurality of data quality metrics are calculated depends upon on a result of the calculation of at least one of the plurality of data quality metrics.

25. The computer-implemented method of claim 1, further comprising:

segmenting the at least one data record into a plurality of data segments based on a result of the calculation of at least a first one of the plurality of data quality metrics; and calculating at least a second one of the plurality of data quality metrics for only some of the data segments.

26. The computer-implemented method of claim 1, wherein the ranking of the plurality of data quality metrics is based on an identity of the at least one workflow process.

27. The computer-implemented method of claim 1, further comprising:

evaluating at least one cost factor, wherein the ranking of the plurality of data quality metrics is based on the evaluation of the at least one cost factor.

28. The computer-implemented method of claim 1, wherein an amount of detail of the representation displayed to the user is selected based on a result of the calculation of at least one of the plurality of data quality metrics.

* * * * *